(12) United States Patent
Tanaka et al.

(10) Patent No.: US 7,333,090 B2
(45) Date of Patent: Feb. 19, 2008

(54) METHOD AND APPARATUS FOR ANALYSING GESTURES PRODUCED IN FREE SPACE, E.G. FOR COMMANDING APPARATUS BY GESTURE RECOGNITION

(75) Inventors: Atau Tanaka, Paris (FR); Julien Fistre, Nantes (FR)

(73) Assignee: Sony France S.A., Clichy (FR)

( * ) Notice: Subject to any disclaimer, the term of this patent is extended or adjusted under 35 U.S.C. 154(b) by 557 days.

(21) Appl. No.: 10/679,650

(22) Filed: Oct. 5, 2003

(65) Prior Publication Data

US 2004/0068409 A1   Apr. 8, 2004

(30) Foreign Application Priority Data

Oct. 7, 2002   (EP)   .................................. 02292474

(51) Int. Cl.
G09G 5/00   (2006.01)

(52) U.S. Cl. ...................................... 345/158; 715/863
(58) Field of Classification Search ................ 345/156, 345/158; 715/863; 600/300
See application file for complete search history.

(56) References Cited

U.S. PATENT DOCUMENTS

| 5,454,043 A | 9/1995 | Freeman | |
| 5,990,865 A | 11/1999 | Gard | |
| 6,244,873 B1* | 6/2001 | Hill et al. | 434/236 |
| 6,249,606 B1* | 6/2001 | Kiraly et al. | 382/195 |
| 6,720,984 B1* | 4/2004 | Jorgensen et al. | 715/863 |

FOREIGN PATENT DOCUMENTS

| DE | 196 12 949 | 8/1997 |
| DE | 197 08 240 | 9/1998 |

| EP | 0 866 419 | 9/1998 |

OTHER PUBLICATIONS

Alsayegh O A et al: "Guidance of video data acquisition by myoelectric signals for smart human-robot interfaces" Robotics and Automation, 1998. Proceedings. 1998 IEEE International Conference on Leuven, Belgium May 16-20, 1998, New York, NY, USA, IEEE, US, May 16, 1998, pp. 3179-3185, XP010281353.

Alsayegh O A: "EMG-based human-machine interface system" Multimedia and Expo, 2000. 2000 IEEE International Conference on New York, NY USA Jul. 30-Aug. 2, 2000, Piscataway, NJ, USA, IEEE, US, Jul. 30, 2000, pp. 925-928, XP010513160.

* cited by examiner

*Primary Examiner*—Amr A. Awad
*Assistant Examiner*—Tom V Sheng
(74) *Attorney, Agent, or Firm*—Oblon, Spivak, McClelland, Maier & Neustadt, P.C.

(57) ABSTRACT

The method obtains a signature (S) of a gesture produced in free space, e.g. for producing gesture recognition commands, by deriving at least one time-evolving signal representative of muscular activity involved in producing the gesture and determining at least one value of a parameter yielded by that signal.

The method comprises the steps of:
time dividing the time-evolving signal (14) into sub-frames (SF1, SF2, . . . ), and
for at least one sub-frame:
determining at least one parameter value (Psfi) yielded by the signal over at least a part of that sub-frame, and expressing said parameter value as a component of a vector (S) along a dimension thereof specifically allocated to that sub-frame (SFi),
the resultant vector yielding the signature (S) of said gesture.

The invention also relates to an apparatus producing such signatures and commands by gesture recognition.

30 Claims, 10 Drawing Sheets

| Recognised class of gesture | Corresponding Media player command |
|---|---|
|  Pointing finger |  play |

| | |
|---|---|
|  Producing extended palm |  Stop |

| | |
|---|---|
|  Rotating a wrist |  Seek-ff or song search |

| Recognised class of gesture | Corresponding Media player command |
|---|---|

Forming a fist → pause / mute

Flexing wrist (inward) → Next track

Flexing wrist (outwards) → Previous track

METHOD AND APPARATUS FOR ANALYSING GESTURES PRODUCED IN FREE SPACE, E.G. FOR COMMANDING APPARATUS BY GESTURE RECOGNITION

The invention relates to the technical field of gesture analysis in which exploitable information is derived from gestures produced in free space. For instance, the analysis can be implemented to derive real-time command inputs to an apparatus, e.g. a media player or other appliance, by gesture recognition, also termed gesture identification. The analysis entails obtaining a signature of a particular gesture from signals produced by the body in accomplishing the gesture, typically electromyographic (EMG) signals detected on the surface of the skin in the region of the muscles producing the gestures.

In the more general field body movement analysis, much of the early research was conducted for medical applications, notably in orthopaedics and prosthesis control. In that context, the analysis is conducted on patients who produce well-defined movements in controlled environments. In particular, the movements are analysed from a fixed reference position of a body portion. For instance, the movement of a forearm is generally made with the elbow or shoulders held stationary at a materialised reference point, e.g. using a rest. With such a restraint, the movements analysed are not gestures produced in free space where, on the contrary, the body and limbs are allowed to move freely without calling on an absolute reference or point of origin.

There is now a demand for man-machine interfacing techniques that allow to extract exploitable information from gestures produced in free space, notably for controlling apparatus or providing feedback on body movements. As a non-limiting example, such man-machine interfaces find applications for commanding music/video (media) player functions, video games, simulators, personal computers, domestic appliances, and can also be used for music generation and other forms of artistic expression.

Extracting useful information from gestures in free space in such a context imposes technical challenges not encountered when a body portion is physically restrained to a fixed reference position. In particular, efficient algorithms need to be implemented to produce a suitable signature from the raw data signals at the sensor outputs, and identify the corresponding gesture from that signature with acceptable reliability and speed.

Typically, the algorithm operates in two modes: a learning—or training—mode, in which a correlation is established between each one of a set of selected gestures and the end information extracted from the corresponding raw data signals, and a recognition mode, in which the correlation acquired in the learning mode is used to identify a particular end information, such as a command, from its corresponding gesture.

An example of a known technique for analysing arm movements in three-dimensional space is disclosed in a paper entitled "EMG-based Human-Machine Interface System" by O. A. Alsayegh, published in Proceedings of the IEEE Conference on Multimedia and Exposition, 2000. In this approach, EMG electrodes are placed on shoulder and elbow joints and their output signals are frequency filtered at a preprocessing stage. Then, their envelope is extracted. Control points representing local and global maximas and minimas (extremas) are extracted from the envelope. Finally, a temporal signature is constructed on the basis of the time instances of the recorded extremas to identify the corresponding gesture. More particularly, the preprocessed EMG signal is time integrated for each time interval between two successive extremas of the envelope. A plot is then produced in a feature space defined by three orthogonal axes, respectively corresponding to different muscles of the subject. For each of these muscles, a given time integral of the envelope signal is plotted on its respective axis. For each particular gesture, successive plotted points produce an ellipsoidal figure in that space which constitutes the gesture's signature. These ellipsoidal figures then serve as references for identifying future gestures.

The study demonstrated that twelve different arm gestures could be recognised in this way.

The invention envisages a different approach which is targeted principally—but not exclusively—at achieving fast and accurate gesture recognition, and which can be used even with less pronounced gestures, such as those involving mainly hand movements. The technique according to the invention results in a highly responsive and intuitive interaction between the subject producing the gestures and the interfaced electronic equipment which can be used to advantage in many different applications in consumer, professional, and institutional fields.

More particularly, the invention provides, according to a first aspect, a method of obtaining a signature of a gesture produced in free space, by deriving at least one time-evolving signal representative of muscular activity involved in producing the gesture and determining at least one value of a parameter yielded by that signal, characterised in that it comprises the steps of:
  time dividing the time-evolving signal into sub-frames, and
  for at least one sub-frame:
    determining at least one parameter value yielded by the time-evolving signal over at least a part of that sub-frame, and
    expressing that parameter value as a component of a vector along a dimension thereof specifically allocated to that sub-frame,
the resultant vector forming the signature of that gesture.

Optional features are presented below.

The steps of determining a parameter value and expressing the latter as a component of a vector can be performed cyclically on the fly as the time-evolving signal progresses to occupy successive sub-frames, so that the resultant vector forming the signature acquires an increasing number of dimensions during the progression of the time-evolving signal.

There can be provided a gesture identification mode for identifying an analysed gesture among a set of previously learnt gestures acquired in a learning mode, each learnt gesture being expressed as a signature vector, wherein a decision on the identification of a gesture under identification is produced while that gesture under identification is still giving rise to an active time-varying signal.

Each learnt gesture can have a determined number of dimensions corresponding to a determined number of sub-frames over which that learnt signature was obtained, wherein the decision on an identification is produced on the basis of fewer sub-frames covered by the time-varying signal of the gesture under identification, relative to that determined number of sub-frames.

The method can further comprise a gesture learning mode comprising, for a given class of gesture to be learnt, the steps of:
  acquiring a set of signatures for that class of gesture by repeatedly producing that gesture and obtaining its signature, storing the set of signatures, and storing the correspondence relating that set of signatures to the learned class of gesture and, optionally, to a command associated to that class of gesture.

The method can further comprise a gesture identification mode, in which a gesture under identification is currently produced, comprising the steps of:

producing on the fly at least one partial signature vector of the gesture under identification, the partial signature vector being limited by the number parameter value(s) currently available, and thereby having fewer dimensions than the learnt signature vectors, for at least one partial signature vector produced, determining which signature among the learnt signatures best matches that partial signature vector, and using the result of that determining step to produce a decision on the identification of the gesture under identification.

In one variant, the decision can be produced from a number of partial signatures obtained over a period bounded by a fixed limited number of sub-frames which is less than the total number of sub-frames used for obtaining the learnt signatures.

In another variant, the decision is produced from a number of partial signatures obtained over a period covering a number of sub-frames which is variable as function of the result of the step of determining which signature among the learnt signatures best matches the partial signature vector.

Advantageously, the method further comprises a step of deriving an envelope yielded by the time-evolving signal, and wherein the parameter value is a parameter value of that envelope.

For instance, the parameter value can be a value of at least one of:

the signal level of the envelope,
the power level of the envelope,
energy level of the envelope,
that value being preferably averaged over the duration of the sub-frame under consideration.

The duration of each sub-frame in the gesture identification mode is advantageously made equal to the duration of its corresponding sub-frame in the learning mode.

The sub-frames can be substantially uniform in duration.

The method can further comprise the step of monitoring the onset of a gesture by detecting the crossing of a threshold in the amplitude of the time-evolving signal, the start of the first sub-frame being made to coincide with the time of the crossing of that threshold.

The time-evolving signal can an electromyographic signal from one of a plurality of sensors, each sensor output being processed as an independent channel.

The time-evolving signal car, be obtained from at least one sensor positioned on a lower limb, preferably a forearm, and more preferably near the top of the forearm, to produce signals representative of a gesture involving a movement of an extremity of the limb, preferably a wrist, hand or fingers.

The time-evolving signal can be obtained from sensors at antagonistic muscle positions.

The method can be applied for commanding an apparatus, wherein at least one signature is made to correspond to a specific command.

The gesture can made to correspond to a selected trigger command setting the apparatus to enter an operating state, e.g. play, skip, pause etc.

At least one signature can be derived from a gesture taken from the following set of gestures:

producing a pointing finger,
producing an extended palm,
rotating a wrist,
forming a fist,
deflecting a wrist inwards,
deflecting a wrist outwards.

The method can be used to command a media player by means of at least one command gesture taken from the following set of command gestures:

producing a pointing finger, e.g. for commanding "play",
producing an extended palm, e.g. for commanding "stop",
rotating a wrist, e.g. for commanding "fast forward", "rewind", or "song seek/fast play",
forming a fist, e.g. for pause/mute,
flexing a wrist (inward), e.g. for commanding "next track" or "step volume up";
extending a wrist outwards, e.g. for "previous track" or "step volume down".

The method can further comprise a step of generating a substantially continuously variable command output from a signal representative of muscular activity involved in producing a gesture.

The substantially continuously variable command output can be made to vary as a function of the natural oscillations of the signal representative of muscular activity involved in producing a gesture, and/or as a function of an envelope of that signal.

The substantially continuously variable command output can be independent of a command produced by gesture identification.

The substantially continuously variable command parameter can be made to control a quantity associated to a command produced by gesture identification.

The signal from which the substantially continuously variable command output is extracted and the signal from which said signature is obtained can originate from mutually different muscular regions, e.g. from respective arms.

The signal from which the substantially continuously variable command output is extracted and the signal from which the signature is obtained can originate from common muscular regions, e.g. from the same arm.

According to a second aspect, the invention relates to an apparatus for obtaining a signature of a gesture produced in free space, by deriving at least one time-evolving signal representative of muscular activity involved in producing the gesture and determining at least one value of a parameter yielded by that signal, characterised in that it comprises:

means for time dividing the time-evolving signal into sub-frames, means for determining at least one parameter value yielded by the time-evolving signal over at least a part of that sub-frame, and means for expressing that parameter value as a component of a vector along a dimension thereof specifically allocated to that sub-frame, the resultant vector forming the signature of that gesture.

According to a third aspect, the invention relates to an apparatus for executing a method according to the first aspect.

According to a fourth aspect, the invention relates an apparatus according to the second or third aspect, housed in a unit wearable by a person and further comprising means for sending extracted command inputs to a command executing apparatus.

According to a fifth aspect, the invention relates to a wearable apparatus responsive to user commands, characterised in that it comprises an apparatus according to any one of the second to fourth aspects.

According to a sixth aspect, the invention relates to the of the apparatus according to any one of the second to fifth aspects for sending user command inputs to an apparatus.

According to a seventh aspect, the invention relates to a computer program product loadable into the memory of a digital computer, comprising software code portions for performing at the steps of any one of appended claims 1 to 26 when that product is run on a computer.

The invention and its advantages shall be more clearly understood from reading the following description of the preferred embodiments, given purely as non-limiting examples, with reference to the appended drawings in which.

Figure 1:
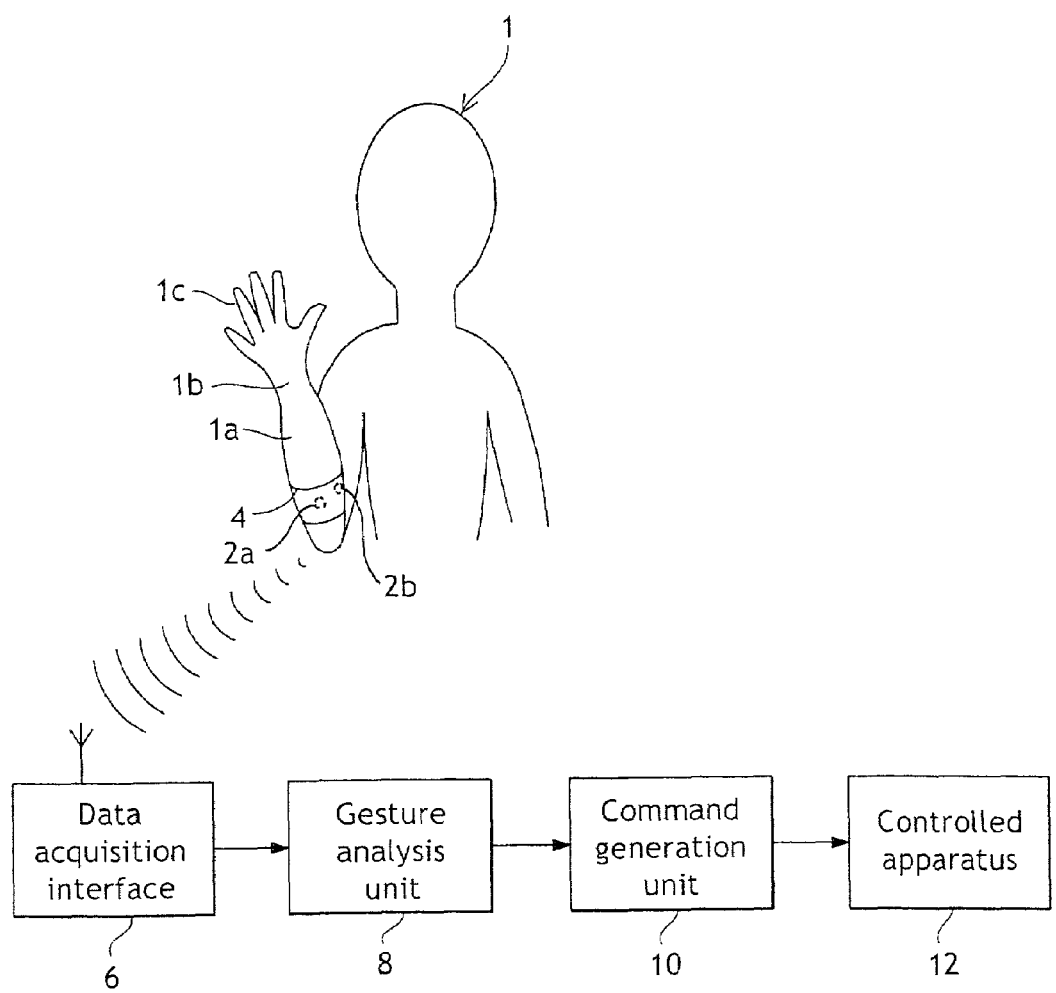
FIG. 1 is simple diagrammatic representation of a subject equipped with EMG sensors on his forearm executing a gesture to be analysed in accordance with the invention.

Referring to FIG. 1, a subject 1 is shown producing a gesture which is analysed in accordance with the invention, the gesture involving a movement at the level of the forearm 1a, wrist 1b and hand 1c of one arm. In the example, the gesture is placing the hand open with the wrist kept substantially unflexed, to express a given command. The overall muscular activity in producing the gesture is detected by a set of two electromyographic (EMG) sensors 2a, 2b positioned near the top of the forearm. Typically, the sensors are arranged to detect signals from antagonistic muscles of that region, e.g. by disposing them appropriately on the inside of a wearable band 4. Other numbers of sensors can be used.

Note that the movement is performed in free space, in that there is no established absolute reference position for the arm or body: the same gesture can just as well be produced e.g. in front of the face.

The data acquired from each of the sensors are digitised and formatted for sending, e.g. by a wireless transfer protocol such as "Bluetooth", to a data acquisition interface 6 where the raw signals are extracted and preprocessed. The signals are then supplied to a gesture analysis unit 8 where a correlation is established between the currently produced gesture and the command it expresses. The result of the correlation is sent to a command generation unit 10 which produces that command in a form exploitable by the apparatus 12 for which it is intended, e.g. a media player.

Figure 2:
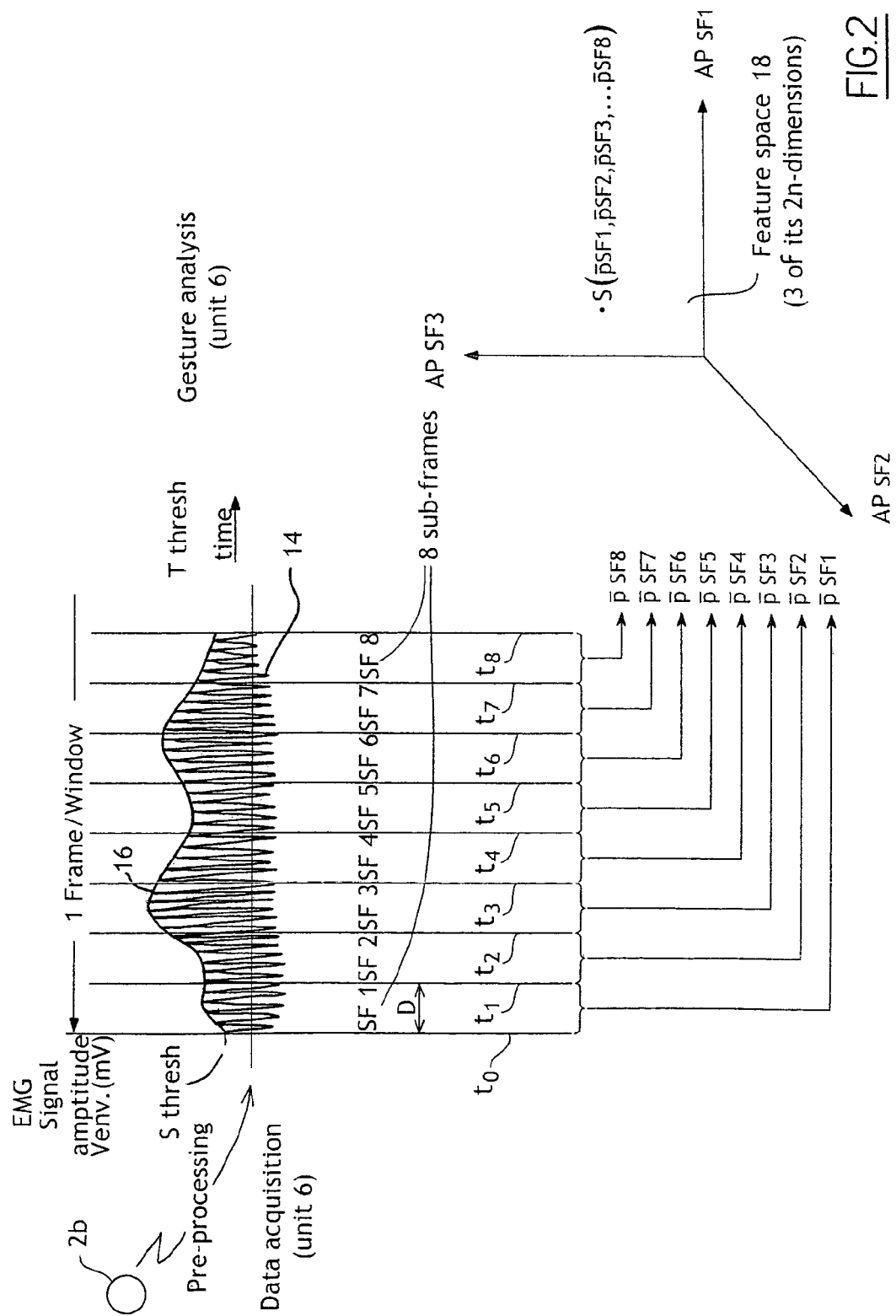
FIG. 2 is a diagrammatic representation of how a signature of a gesture i produced from sensor signals in accordance with an embodiment of the invention.

The basic analysis performed by the gesture analysis unit 8 is illustrated in FIG. 2 for the signal from one of the sensors (sensor 2b in the example), it being understood that the same analysis is performed in parallel for the signal from each of the other sensors. The preprocessed raw signals from the sensor are submitted to preprocessing by the data acquisition unit 6 and sent as preprocessed EMG signals 14 (hereafter designated "EMG signal") to the gesture analysis unit 8. The EMG signal constitutes an example of what is generically termed a time-evolving signal.

At the gesture analysis unit 8, the EMG signal level is constantly monitored to trigger a signal analysis program as soon as that level exceeds a first predetermined threshold Sthresh. More particularly, when that threshold Sthresh is crossed, a time count starting from time t0 is initiated. This time t0 defines the start of a time window or frame F.

The envelope 16 of the EMG signal 14 is extracted using standard signal filtering techniques well known to the skilled person. The envelope is a time varying signal (typically a voltage), which expresses the modulation—or variation—of the EMG signal on a time scale considerably longer than the periodicity of normal EMG signal oscillations. The curve of the envelope 16 generally follows the normal peak and trough values of the EMG signals 14, as shown, or its square. The EMG signal may be initially rectified.

Starting from time t0, the evolving frame F is divided into successive sub-frames SF1-SF8. The times t0-t8 at the boundaries of adjacent sub-frames are set beforehand. In the example, each sub-frame SF1-SF8 has the same duration D; however, the duration need not necessarily be uniform for the different sub-frames. This duration is fixed empirically by prior analysis of gestures, and is set so that at least a chosen minimum number of sub-frames can be expected to be produced during the existence of the envelope 16. The sub-frames serve to produce the signature of the envelope in terms of a set of parameter values of the envelope, each value reflecting a characteristic feature of the portion of the envelope in its corresponding sub-frame SF1-SF8. More specifically, each value expresses a magnitude along a respective orthogonal dimension of a feature space 18, which is a vector space. The signature is thus expressed as a vector quantity with respect to a point of origin of the feature space, typically the point of zero value of all the orthogonal dimensions. Thus, in accordance with classical mathematical rules, the signature vector space of the signature is defined by set of n orthogonal unit vectors si (where i takes on all values from 1 to n), whereby a signature vector is expressed by a point $S(Psf1.s1, Psf2.s2, Psf3.s3, \ldots, Psfn.sn)$, where each coefficient Psfi is a scalar coefficient equal to the parameter value (in ad hoc units) determined for the portion of the envelope over the sub-frame SFi.

In Euclidean space, the magnitude $|S|$ of the signature vector from the point of origin is simply $|S|=[(Psw1)^2+(Psw2)^2+(Psw3)^2, \ldots, +(Pswn)^2]^{1/2}$.

In the example, the parameter Pi considered is the time averaged signal level (volts) of the envelope 16 for its portion occupying the corresponding sub-frame SFi. The envelope signal averaging can be effected in a variety of different ways, e.g. by averaging over a set sampled signal values over the sub-frame considered (in its simplest form, this can achieved by simply taking the average of initial and last signal values of the sub-frame), or by time integrating the evolution of the signal over the sub-frame and dividing it by the duration D.

In variant embodiments of the invention, instead of being the level of the envelope signal, the parameter can e.g. be one or a combination of the following:
the average power of the envelope over the sub-frame considered (the envelope 16 in this case being produced from the square of the raw signal level, possibly rectified),
the energy of the envelope,
the rate of change of signal level, power or energy, etc.

Similarly, the time averaging of the parameter can instead be replaced by another mathematical property, e.g.:
the minimum or maximum value within the sub-frame,
the median value over a given set of sample values within the sub-frame,
etc.

While the envelope 16 constitutes a preferred form of the signal 14 from which to determine its parameter values, it can also be envisaged in variant embodiments to consider a parameter of the signal 14 without recourse to deriving an envelope, the parameter being in this case taken directly from the signal. That parameter can also be any one of the above-mentioned parameters, or a frequency characteristic of the signal 14, for instance an average time period during a sub-frame, etc.

The signature is acquired in real time, i.e. on the fly, as the envelope 16 evolves in time to occupy successive sub-frames. Thus, as soon as the envelope 16 has evolved in time past the first sub-frame SF1 (at time t1), the time averaged signal level Psf1 of the envelope 16 is determined (in ad hoc units) for that sub-frame and stored in a memory portion allocated specifically to the first orthogonal dimension of the signature vector S. This procedure is repeated cyclically, each iteration resulting in the acquisition of the following orthogonal component value of the signature vector S.

The signature vector S is represented graphically for the first three of its orthogonal components, each illustrated by a respective orthogonal axis APsf1, APsf2, APsf3 forming part of a multidimensional feature space 18 (which would have n dimensions in reality). To this end, each axis APsfi is graduated in the ad hoc units of the determined parameter. In this representation, the magnitude of component Psf1 is plotted along its corresponding axis APsf1 as soon as that magnitude is determined, and more generally each magnitude of component Psfi is shown in that representation as plotted along its orthogonal axis APsfi.

The signature S in that feature space representation is expressed as the position of a single mapped point with respect to an origin. Note that this point of the feature space representation starts to exist as soon as the first magnitude value Psf1 of the vector component Psf1 is determined, that point evolving in real time to occupy a successively increasing number of dimensions of the feature space 18 as more values Psfi become available.

The above approach of acquiring the signature vector S of the envelope in an incremental manner as and when a vector component magnitude value becomes available is advantageous for identifying a gesture in real time, and makes it possible to obtain, if needs be, a gesture identification with only a subset of the full set of n vector components, i.e. before considering all the possible time sub-frames, as shall be explained in more detail further.

When managing signals from several sensors 2a, 2b in parallel, the above signature vector acquisition procedure is simply combined in a multi-channel analysis for each of the corresponding extracted envelopes.

More particularly, in the example of a two-sensor system, the EMG signals from each the three sensors 2a, 2b give rise to corresponding envelopes each divided into sub-frames SF1-SF8 which are the same for each of the two envelopes.

The three two then together yield two respective parameter values $P_a$swi, $P_b$swi at each sub-frame SFi, each constituting the magnitude of a respective orthogonal component of the signature vector S. More generally, the complete signature for n sub-frames and j sensor channels has n*j orthogonal components, i.e. occupies n*j dimensions in its feature space representation, and is acquired in sets of j orthogonal vectors at a time. The complete signature for the two sensors is thus given by S($P_a$Sf1, $P_b$sf1 $P_a$Sf2 $P_b$sf2, $P_a$Sf3, $P_b$sf3, . . . , $P_a$sfn, $P_b$sfn,), where each of the P values is the coefficient (determined parameter value) of its corresponding unit vector (not indicated here for conciseness) of the signature vector space. In other words, a signature vector is stored as a set of these P coefficient values indexed against their corresponding dimension.

There shall now be explained how this signature forming technique can be used in a gesture identification application, e.g for recognising a class of gesture being analysed among a set of learnt gesture classes. Such an application comprises a learning mode (also referred to as a training mode), and an identification mode. Here, the term "class" is used-for identifying a type of gesture; in the convention used here, each specific type of gesture considered (e.g. pointing, rotating the wrist, etc. ) is ascribed to a respective class designated Gx, where the suffix x is a unique identifier of the gesture The procedure begins at as stage where the duration D and number of sub-frames SF have already been determined experimentally. These factors are considered in correspondence with the length of the complete frame F, itself determined in terms of the start threshold Sthresh and a termination threshold Tthresh that corresponds to the dropping of the envelope below a prescribed level.

In the learning mode, envelopes are analysed over all the predefined sub-frames SF1-SF8 so as to acquire the most complete form of the signature S for future reference. The learning mode is of the supervised type, wherein the gesture is learnt in correlation with its class supplied as an input and, if needs be, with a specific command associated to the class of gesture.

Figure 3:
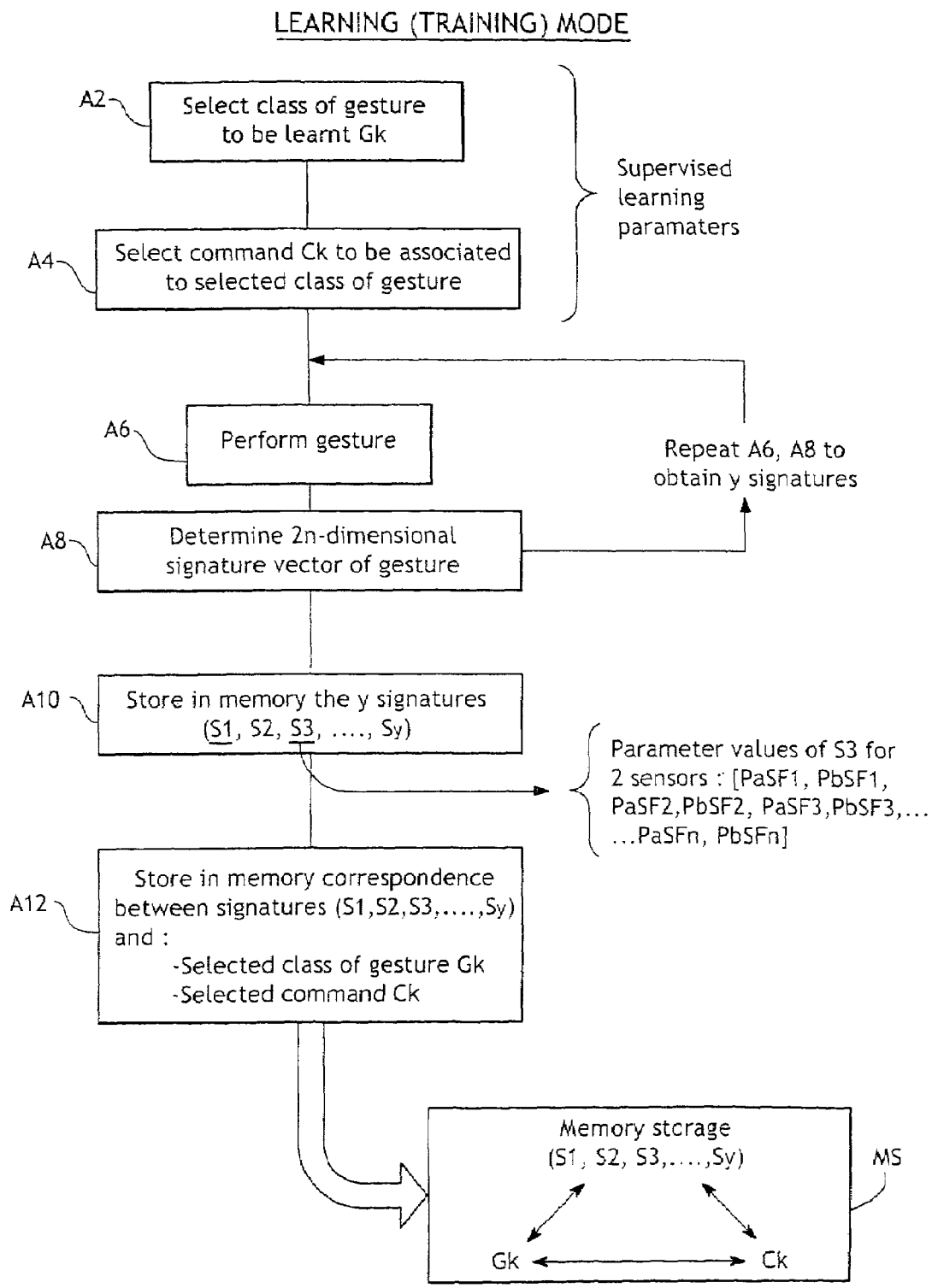
FIG. 3 is a flow chart of a learning mode in a gesture identification application in accordance with a preferred embodiment of the invention.

A possible protocol for the learning mode is given by the flow chart of FIG. 3. The protocol begins by selecting the class of gesture to be learnt, designated Gk (step A2) and, if needs be, the command Ck associated to the selected class of gesture (step A4), these constituting the supervised learning parameters. Then a subject equipped with the electrode armband 4 is made to perform the gesture of the corresponding class (step A6), and the 2n-dimensional signature of that gesture is determined (step A8). The 2n dimensions in this example are developed over the n sub-frames SF1-SFn for each of the two sensors 2a, 2b. Steps A6 and A8 are executed a specified number of times y (step A10), and the thus-obtained y signatures S1, S2, S3, . . . , Sy) are stored in a memory (step A12). In practice, the stored quantities are the parameter values acquired as described above for each of the signatures. The figure shows the stored signature contents for one of the signatures S1, these being composed of the 2n values S($P_a$sf1, $P_b$sf1, $P_a$sf2 $P_b$sf2, $P_a$sf3, $P_b$sf3, . . . , $P_a$sfn, $P_b$sfn,).

The memory further stores the correspondence between the set of signatures {S1, S2, S3, ..., Sy} and: i) the selected class of gesture Gk, and ii) the selected command Ck (step A12). The resulting correspondences are stored in the memory as shown in box MS.

In other words, the memory contains an indexed correspondence table linking together the signatures vectors S1-Sy, gesture Gx and command Cx.

In applications where the gesture identification is not used for command purposes, the above correspondence to the command Cx can simply be ignored.

The above process is carried out in the same manner for each new class of gesture to be learnt. Thus, in the general case of m different classes of gesture learnt, assuming each class is sampled over the same number y of repeated gestures, there shall be a total of m*y stored signatures, which collectively forms the learnt corpus, each with a correspondence table correlating to a specific gesture and, when the application so requires, to a specific command.

For each class of gesture Gx, the y signature vectors, while not being identical owing to natural human inconsistencies, nevertheless lie within a common range of vector values. In a feature space representation, this common range would correspond to a cluster of y points plotted for the learnt gesture Gx. The learnt signature points of a cluster should preferably exhibit the least possible variance.

It is ensured in the learning phase that the m above ranges are well separated—or equivalently that the in corresponding clusters in feature space are well separated—to ensure that each of the learnt gestures can be clearly distinguished.

Once a required number of gestures have been learnt as above, the gesture identification mode can be initiated. In that mode, a gesture produced—hereafter referred as a "candidate" gesture (or gesture under identification) Gc—is analysed to determine its class G. Once identified, the gesture can then be used for sending a corresponding command C or for generating some feedback or other response.

The identification mode comprises extracting the signature vector Sc of the candidate gesture under the same parameter settings as in the learning mode. In particular, the timings and durations D of the sub-frames used in the learning mode are kept for the identification mode. However, as explained below, only some of the sub-frames will generally be considered, the identification thus being based on a partial form of the signature for the candidate gesture.

Then, a comparison technique, typically a nearest neighbour analysis, is applied to that partial signature Sc to determine a closest match among the signatures of the learnt corpus. The candidate signature Sc is then attributed as having for origin the same class of gesture as the one of the matching signature in the learnt corpus.

Figure 4:
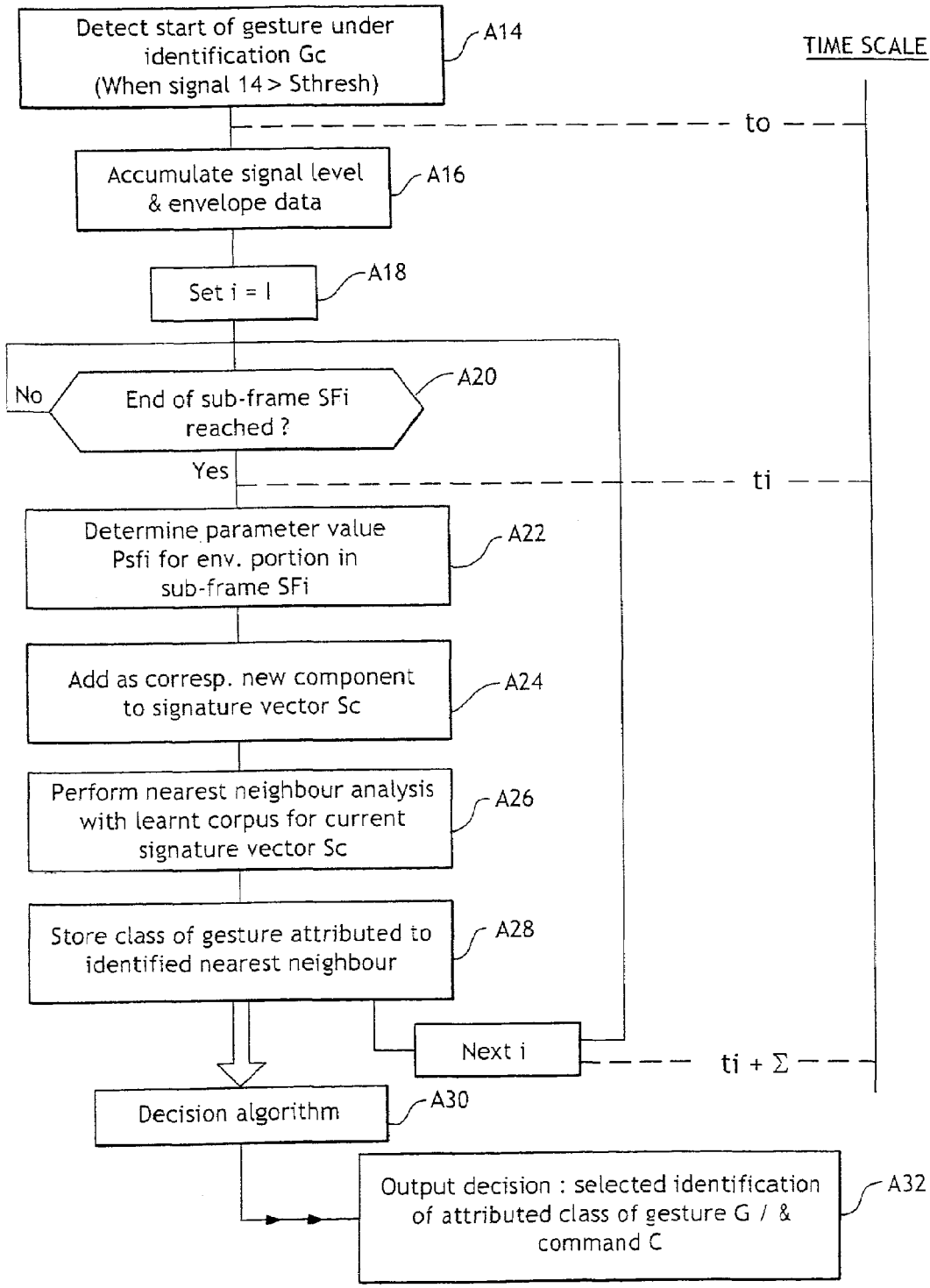
FIG. 4 is a flow chart of a gesture identification mode in a gesture identification application in accordance with a preferred embodiment of the invention.

The core aspect of the gesture identification routine according to an embodiment is shown by the flow chart of FIG. 4 for one sensor channel, it being clear that the same procedure is applied in parallel for all active sensors.

The procedure starts by detecting the onset of a gesture to be identified Gc in terms of the crossing of threshold Sthresh (step A14). The required data for determining the envelope parameter is sampled and accumulated on a continuous basis for exploitation (step A16) and a variable index i associated to the $i^{th}$ sub-frame SFi is set to 1 (step 18). The moment when the current sub-frame SFi ends is detected (step A20) and the parameter value Psfi for the envelope portion of that sub-frame SFi is determined (step A22). This value is the coefficient of its associated unit vector to form the signature vector Sc (step A24). There is then performed a nearest neighbour analysis which compares the vector separation between the current form of the candidate signature vector with the signature vectors of the learnt corpus. Note that the analysis is made for just the partially occupied dimensions, that is the first i vector component(s). In a multi-channel situation, the components from the other sensor(s) at step 24 would be incorporated into the nearest neighbour analysis performed at step A26. In the nearest neighbour analysis, the signatures of the learnt corpus are exploited in a form limited to have the same number of dimensions as the current signature Sc being analysed, using standard techniques.

The class of the gesture attributed to the thus-identified nearest neighbour in the learnt corpus is recorded for later reference (step A28).

The procedure then loops back to the step A20 to repeat the above operations on the next sub-frame.

Note that steps A14 to A24 can also be implemented to acquire signature vectors in the learning mode, these steps in this case being followed e.g. by step A10 et seq. of FIG. 3.

A constraint can be added whereby the Euclidean distance in vector space between the candidate signature Sc and the most closely matching signature of the learnt corpus must not exceed a prescribed limit value δ. This serves to filter out spurious or insufficiently identifiable gestures that could otherwise give rise to an unacceptable identification error rate.

In the example, the determination of the best match in the nearest neighbour analysis (step A26) is obtained by a routine that computes the separation between the candidate signature vector Sc and each of the signature vectors of the learnt corpus, and then selects the signature vector of the learnt corpus for which that separation is the smallest.

A decision algorithm is made to come into play (step A30) after a number of nearest neighbours have been identified by iterations of step A28. Its purpose is to produce a decision by choosing one nearest neighbour of the learnt corpus among the respective nearest neighbours determined by iterations of step A28, these not necessarily being the same.

Once that algorithm has made its choice, the class of gesture attributed to that chosen nearest neighbour signature is retrieved from the appropriate entry in the correspondence table and assigned to the candidate signature vector (step A32).

Note that in the preferred embodiment, the search for identification of the candidate signature is conducted on the fly, i.e. in real time, as can be seen from the time scale on the right of FIG. 4. Here, it can be seen that the result of the nearest neighbour analysis (step A28) is obtained substantially as soon as its corresponding time-frame is completed, to within a small delay ε corresponding to the execution time for steps A20-A28. In other words, the procedure does not wait to have to the complete set of vector components of the candidate signature vector before conducting the nearest neighbour analysis or equivalent matching technique. This follows from the Applicant's observation that in a typical practical situation, while it is unlikely that the first sub-frame provides a sufficiently reliable identification to distinguish a class of gesture, that class can nevertheless often be identified well before the candidate gesture's envelope has reached the end threshold Tthresh.

In one form, this is achieved by establishing beforehand that a decision on the identification must taken on the basis of a limited set of sub-frames among the n sub-frames covering the evolution of the envelope for the candidate gesture. For instance, it can be imposed that a decision must reached on the basis of the parameter values taken from the first r successive time frames, starting from the first SF1, with r<n.

Figure 5:
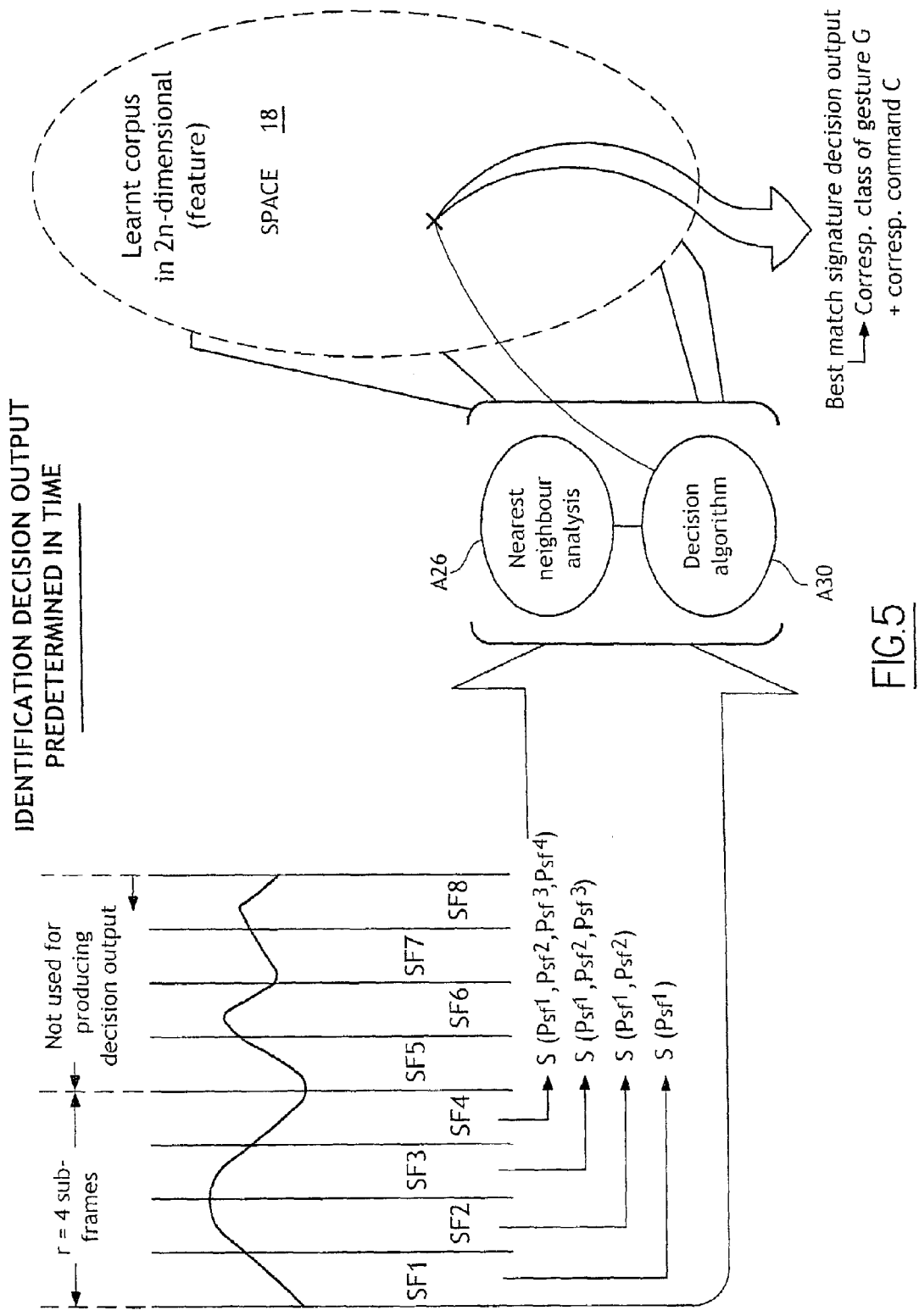
FIG. 5 is a diagrammatic representation of an identification mode in accordance with an embodiment in which moment the output of a decision on an identification is bounded in time.

This form of execution is illustrated by FIG. 5 for the case of r=4 sub-frames.

As soon as the parameter value for the first sub-frame SF1 has been acquired, the corresponding partial signature vector S is established for the first dimension. This value is submitted to a comparison (nearest neighbour analysis A26) with the signature vectors of the learnt corpus, as explained above, for the corresponding dimension.

The result of that early comparison is recorded in terms of the corresponding gesture for the closest match.

The above is repeated as soon the parameter value for the next sub-frame SF2 has been acquired. In this case, the corresponding partial signature vector is established for both the first and second orthogonal dimensions. The result of the second comparison is likewise recorded.

The procedure is thus continued for each sub-frame up to and including the sub-frame SFr, with signature vector submitted for identification each time being constructed with the components already acquired, supplemented by the currently acquired component.

When all the r sub-frames SF1-SFr have thus been processed, there is a set of r identification results at disposal from which to produce a final decision (decision algorithm A30). The decision can be produced through different decision algorithms and statistical techniques. A weighting coefficient can also be applied based on the fact that successive results obtained become more reliable as they come to encompass more parameter values.

The above is an example where the end of the identification decision process generation is fixedly bounded in time (the data acquisitions exploited for outputting at least a first outputted decision ending at time tr). One of its advantages is to be guarantee to have a decision outputted after a known and constant time period starting from the moment t0.

In accordance with another approach, the moment of decision in the identification is variable in time that moment being determined rather by the consistency of the results currently at disposal.

Figure 6:
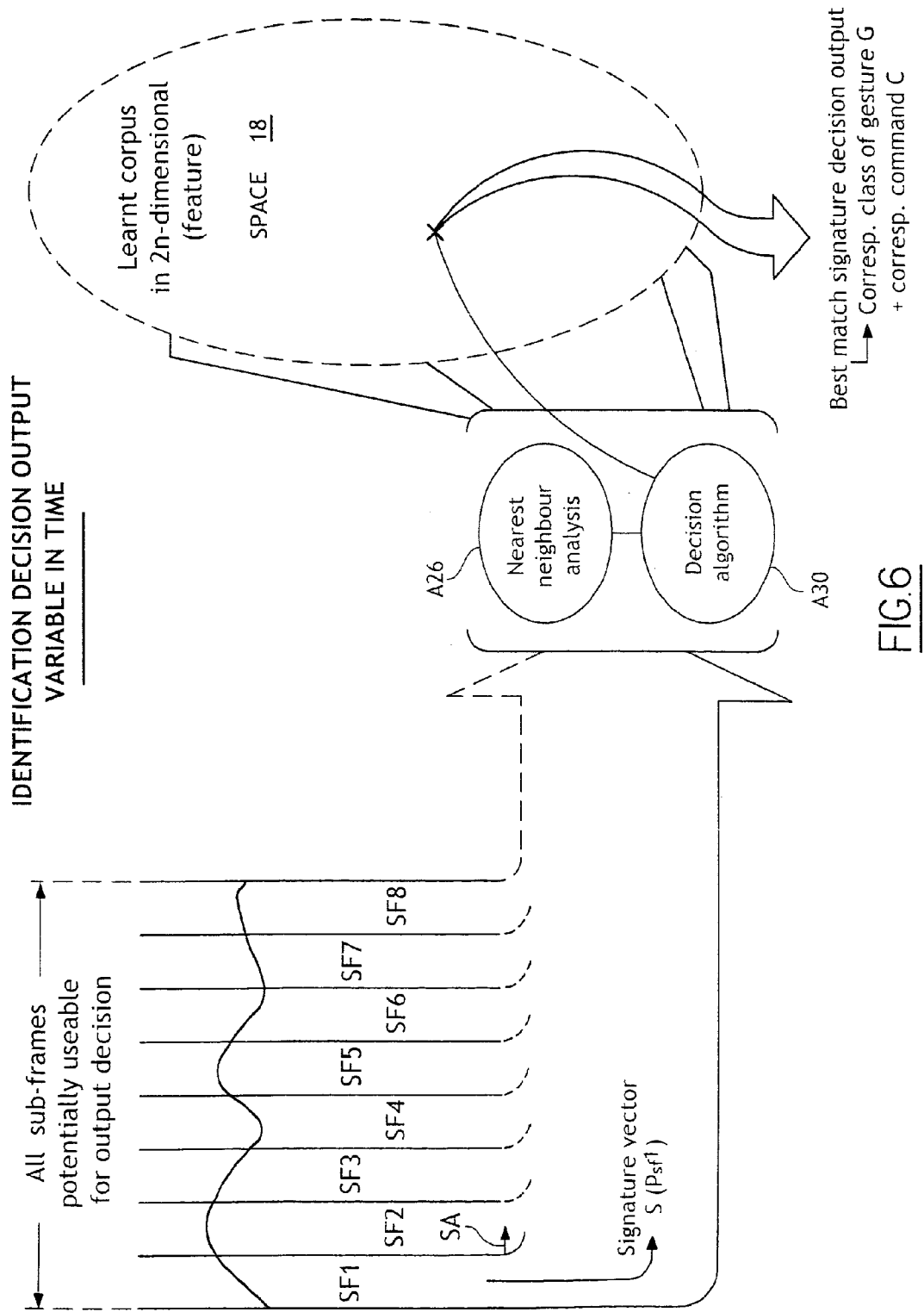
FIG. 6 is a diagrammatic representation of an identification mode in accordance with an embodiment in which the moment of output of a decision on an identification is variable in time.

This form of execution is illustrated by FIG. 6.

Here, the procedure is as for above as regards establishing the signature vector components for successive sub-frames and each time obtaining a gesture identification. However, in this case, the successively obtained identification results are compared on the fly. Once it is determined that the results at disposal tend predominantly to one particular class of gesture, in accordance with pre-established rules, the decision to identify the candidate gesture to that class of gesture is produced. The decision is thus outputted for exploitation at the conclusion of a variable number of sub-frames processed, that number depending on the consistency of the accumulated identification results. The evolution of the input to the signature vector is illustrated in FIG. 6 by the arrow SA. As that arrow advances in time with the passing of the sub-frames, it allows correspondingly more vector components from respective time-frames to be entered into the nearest neighbour analysis A26 and decision algorithm A30, up to the time when the latter has been able to make a decision on an identification. This approach has the advantage of ensuring a uniformly high identification reliability by according more sampling sub-frames to signals that are found to be initially less consistent.

In both approaches, vector components from further sub-frames can be submitted to nearest neighbour analysis, e.g. to provide a possibility of correcting an earlier erroneous decision that has been previously outputted.

In all the approaches, a visual or audio prompt is sent for the person to repeat the gesture if the results obtained do not allow to produce a satisfactory decision at the conclusion of either the r sub-frames (time bounded variant) or of the complete frame F (variable moment of decision output variant), e.g. if too many results fall outside the imposed limit δ.

The possibility thus afforded of producing a decision on an identified candidate gesture as soon as a satisfactory correlation with a class of the learnt corpus has been found greatly contributes to the speed of identification and to giving the person the impression of a highly responsive and intuitive gesture interfacing.

The gesture identification in accordance with the invention is particularly well suited for identifying gestures expressed at the level of the hand and wrist.

For instance, each of FIGS. 7a to 7f illustrates one of a set of gestures that can be identified and distinguished with excellent reliability using the above-described gesture identification technique, e.g. to command a media player such as a personal or component system audio compact disk (CD) or cassette player, VCR, PC music player, etc.

Figure 7A:
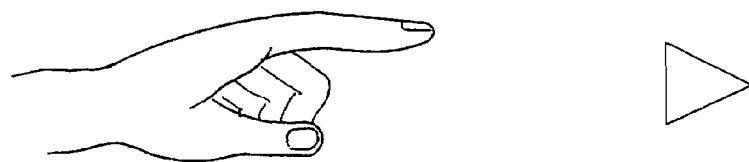
FIGS. 7a to 7f illustrate examples of six different hand/wrist gestures that can be identified in accordance with the preferred embodiment for controlling a media player.
Figure 7A:
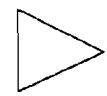
Figure 7B:
Figure 7B:
Figure 7C:
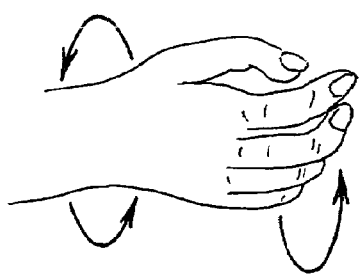
Figure 7C:
Figure 7D:
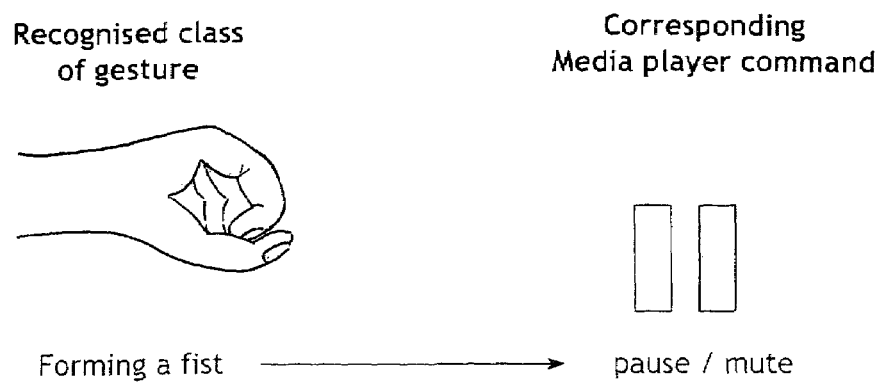
Figure 7E:
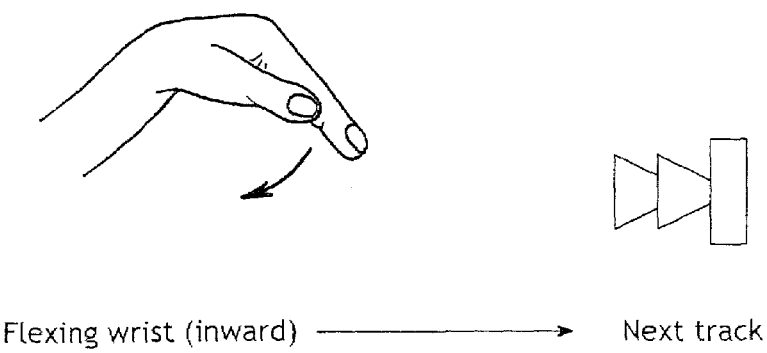
Figure 7F:
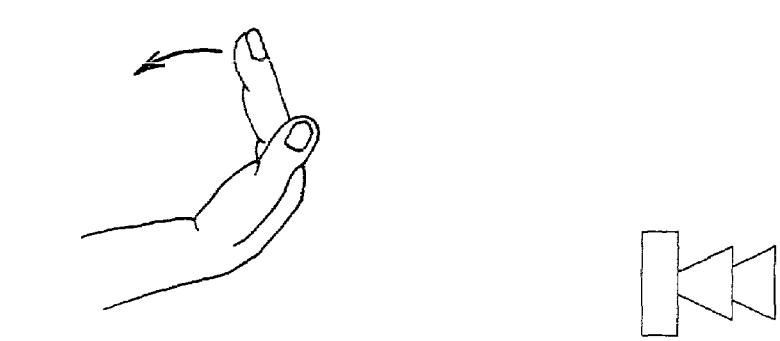

In the illustrated example, each gesture is associated to a specific compact disk player transport command as follows:
  a) pointing finger=>play, cf. FIG. 7a,
  b) palm extended=>stop, cf. FIG. 7b,
  c) wrist rotating (either clockwise or anticlockwise)=>seek-fast forward/song search (i.e. fast play of CD to advance quickly along a track), cf. FIG. 7c,
  d) forming fist=>pause or mute, cf. FIG. 7d,
  e) wrist flexion (inward flick of the wrist)=>jump to next track, cf. FIG. 7e,
  f) wrist extension (outward flick of the wrist)=>jump to previous track, cf. FIG. 7f.

The above six gestures have been found by the Applicant to represent particularly judicious choices as regards their intuitive expression, ease of execution in free space, and ability of being well distinguished from the others by the above gesture identification technique.

Figure 8:
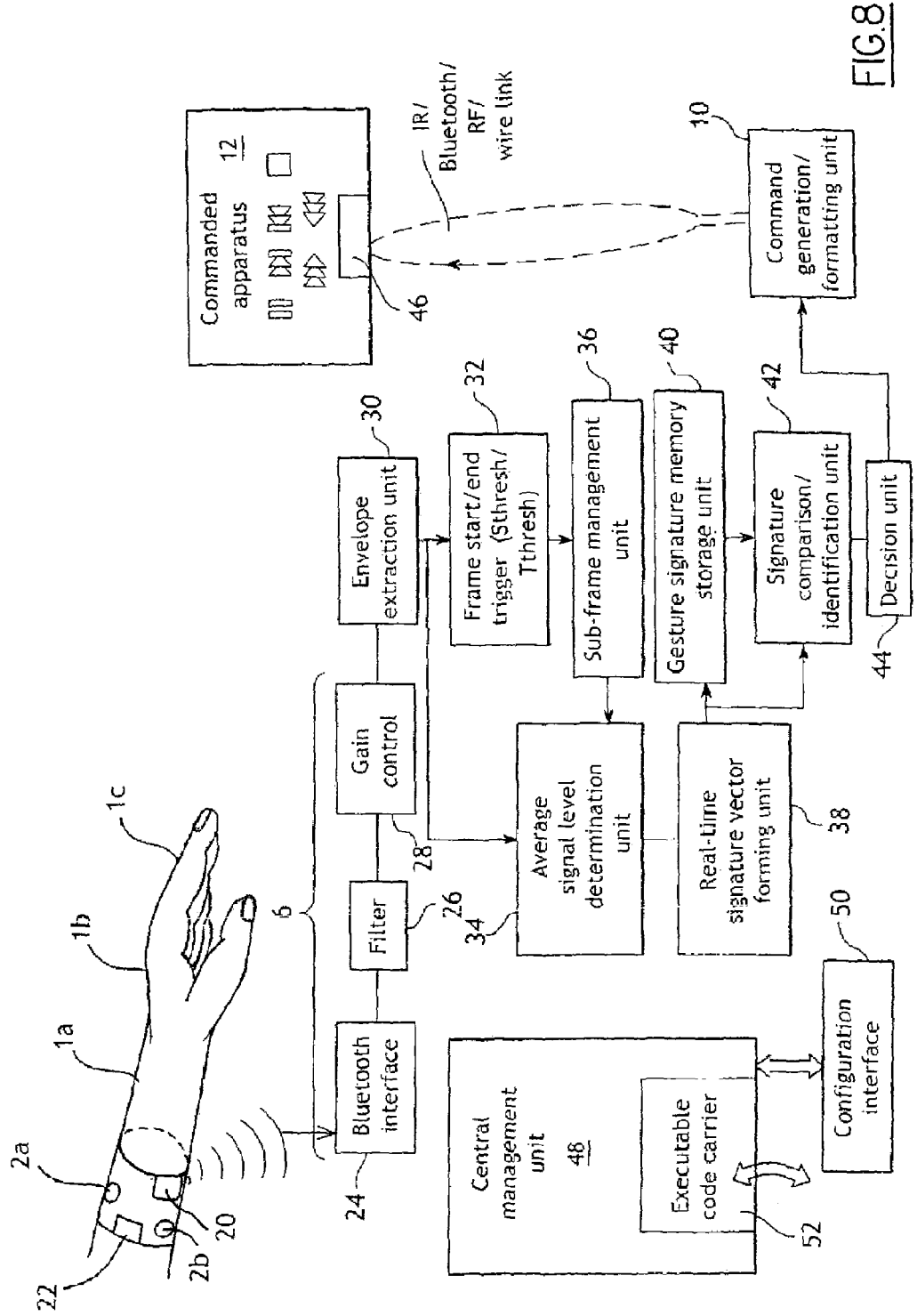
FIG. 8 is a block diagram of an embodiment forming a gesture identification command system implementing a gesture signature extraction method in accordance with the invention.

FIG. 8 shows in a simplified bloc diagrammatic representation the functional units of a complete system for executing commands from gestures in a accordance with the invention.

The sensors 2a, 2b and 2c (which can also be just two in number) are placed in a sleeve band 4 which additionally includes a Bluetooth wireless interface module 20 (with antenna) for sending the raw EMG signals, and a battery 22 for activating the latter and the sensors. Alternatively, the sensor signals can be sent by another wireless protocol or over a wire link. In the example, the armband contains all the wearable hardware for the gesture identification. Accordingly, the Bluetooth interface module 20 also incorporates an analog-to-digital converter for digitising the raw sensor signals prior to formatting and sending. In a variant embodiment, the armband is simplified by containing just the sensors 2a-2c, these being wire linked to a separate wearable unit, such as a waist pack. The latter comprises the batteries for the wearable hardware, sensor signal analog-to-digital conversion stage and Bluetooth protocol module.

At the receiving end, the sent raw EMG signals are detected by a Bluetooth interface 24, from which they are sent to filter and gain control stages, respectively 26 and 28, for preprocessing. Units 24-28 correspond to the data acquisition interface 6 of FIG. 1.

The envelope 16 of the preprocessed EMG signal 14 is obtained by an envelope extraction unit 30 and sent both to a frame start and end detection unit 32 and to an average signal level determination unit 34. The frame start and end detection unit 32 serves to establish the complete frame F within which the envelope can be exploited, that is the time of start and termination of the frame, as determined by the crossing of the thresholds Sthresh and Tthresh respectively.

The frame start and end detection unit 32 cooperates with a sub-frame management unit 36 whose function is to establish the different sub-frames SF1, SF2, .... To this end, the sub-frame management unit is programmable to slice a frame into the appropriate sub-frames (in terms of number and duration) for an optimum identification. This unit 36 further sends signals to the average signal level determination unit 34 to indicate the time boundaries t0, t1, t2, t3, ... of the successive sub-frames considered. The average signal level determination unit 34 thus calculates the signal level of the envelope 16 averaged over intervals corresponding to the duration D of the sub-frames according to the time boundaries supplied.

Each time an average signal level value for a sub-frame is obtained, it is sent to a real-time signature vector forming unit 38, the latter generating the signature Sc in an incremental manner. The thus-obtained signature is sent both to a signature storage unit 40 for constructing a library of signatures, notably in the learning mode to form the learnt corpus, and to a signature comparison/identification unit 42 which performs the nearest neighbour analysis or equivalent.

The latter unit accesses in real time the storage unit 40 for conducting a nearest neighbour analysis or other equivalent comparison between the current signature and stored signatures.

The signature comparison/identification unit 42 outputs in real time the associated class of gesture of the thus-identified identified nearest neighbour to a decision unit 44 which performs the above-described decision algorithm. The latter outputs its choice of decision, in terms of a selected-identified class of gesture, to the command formatting unit 10 of that command. The latter formats the command to a form recognisable by the controlled apparatus 12, e.g. a CD player in the figure. The formatting unit further provides a communication interface with a communications port 46 of the controlled apparatus, that port being e.g. also a Bluetooth interface, an infrared or a radiofrequency port, or even a wire link with the command formatting unit 10.

The command formatting unit 10 can store different command formats and communication protocols so as to allow the upstream portion 6, 8 of the gesture apparatus to be universally applicable to different types and models of controlled apparatus 12.

The overall operation of the entire device is handled by a central management unit 48 comprising memories, a CPU and the necessary controller, interface boards, etc., as may be found e.g. in a personal computer.

The different operational parameters of the gesture identification system 100 are configurable by means of a user configuration interface 50 comprising e.g. a PC with a data exchange port to the central management unit 48.

The software code for executing at least some of the different operations executed by the above-described units 2 to 50 is contained in a software code carrier 52, such as a CD ROM or the like.

The latter is insertable into an appropriate reader of the central management unit 48, whereby its software code, which includes an executable program, can be loaded to execute the gesture identification—or some aspects thereof—as described above.

Figure 9:
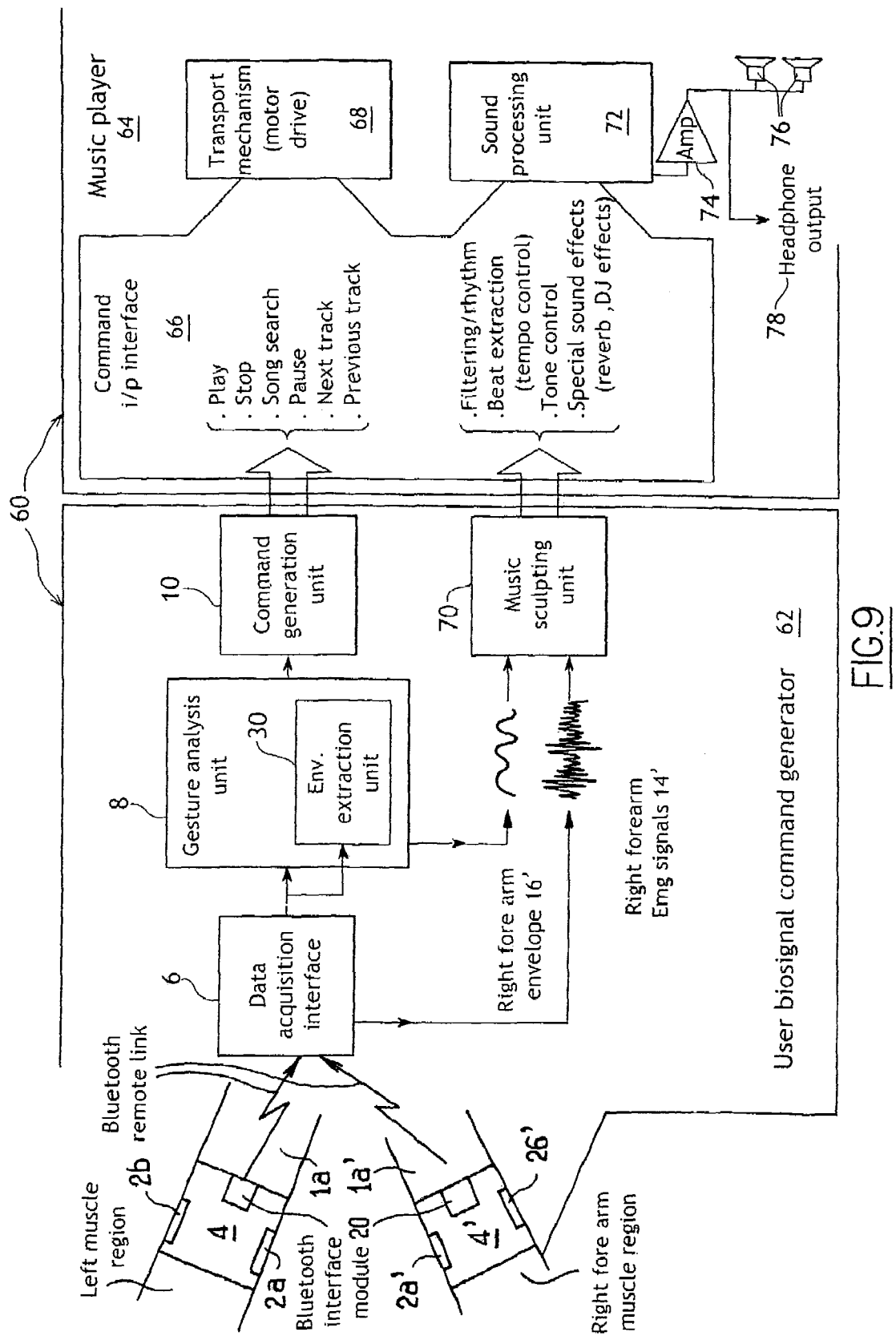
FIG. 9 is a block diagram of an embodiment of a user biosignal command generator based on the system of FIG. 8 with additional means for separately entering music sculpting commands from muscle activation signals.

The raw EMG signals—or other signals expressing muscular activity—can also be used separately or in combination with the above-described gesture analysis technique to express more continuous forms of commands or signal inputs to a responsive system, as illustrated with the example of FIG. 9 which shows the architecture of a biosignal controlled personal music system 60.

This system is composed of a user biosignal command generator 62 and a music player 64, such as a CD player with sound effect processing capability.

In the example, the user biosignal command generator 62 incorporates the apparatus of FIGS. 1 and 8, i.e. the set of sensors 2a-2c, sensor carrier armband 4 (designated hereafter "first armband"), data acquisition interface 6, gesture analysis unit 8 and command generation unit 10. These system components 2-10 are arranged to execute command gesture identification for the gestures of FIGS. 7a-7f through the technique described above with reference to FIGS. 1 to 8. In this way, a user can send to the music generator 64 (via it command input interface 66) the required transport commands (play, stop, song search, pause, next track, previous track, ... ) by effecting the corresponding gestures (respectively: pointing finger, extending palm, rotating wrist, closing fist, flexing wrist, extending wrist). These commands are then acted upon in the usual manner by the music player's transport mechanism 68 which includes a motor drive and associated servos.

In parallel, the user can enter music "sculpting" commands, i.e. commands that influence characteristics of the sound produced by the music player 64. These sculpting commands are also taken at their origin from muscle fibres, and are detected by a second set of EMG sensors 2a', 2b' and 2c' contained in a second armband 4' similar to the first armband. Typically, the first and second armbands 4' and 4 are worn on different forearms, selected arbitrarily in the example to be the left and right forearms respectively.

The outputs from the second set of sensors 2a'-2c' are sent to respective input channels of the data acquisition interface 6 using a Bluetooth protocol, as for the first armband 4. At that interface 6, they are preprocessed to produce appropriately shaped raw EMG right signals 14' corresponding to the right arm (designated "right arm EMG signal"). The right arm EMG signal 14' is sent both directly to a music sculpting unit 70 and to the envelope extraction unit 30 of the gesture analysis unit 8. To this end, the envelope extraction unit 30 is equipped with additional channels to extract the respective envelopes 16' (designated "right arm envelopes") from the inputted right arm EMG signal channels 14' of the respective sensors and deliver those right arm envelopes 16' directly to corresponding inputs of the music sculpting unit 10.

The latter is programmed to analyse and extract characteristic properties available from either or both of the preprocessed raw right arm EMG signal 14' and the right arm envelopes 16' it thus receives. For instance, these properties can be the frequency, amplitude, time variation, energy, power, etc. of all or selected ones of the signals 14' and 16' supplied to the music sculpting unit 70. From these characteristics, the music sculpting unit 70 produces corresponding sound influencing commands, such as: filtering, rhythm imposition or generation, beat extraction (for tempo control), special sound effects, such as reverberation, Disc Jockey effects (such as scratching, reverse playback, etc.) and the like. It then formats these sound influencing commands for sending to the command input interface 66, from which they are inputted to a sound processing unit 72 of the music player 64. The commands from the command generation unit 10 and the music sculpting unit 70 can be sent to the music player's command interface 66 through a Bluetooth wireless protocol, infrared or radio link, or by wire link.

The sound processing unit 72 executes the received sound influencing commands to produce the required sculpting. The resultant sound, composed of the sound recorded on the CD (or other medium) being played with the thus-produced sculpting is sent through an amplifier 74 and to speakers 76 and/or a headphone output 78.

The above is an example of a substantially continuously variable command output, in this case extracted from the signal of the second armband 4', which is unrelated to the commands produced by gesture identification, in this case extracted from the signal of the second armband 4.

In other embodiments and applications, however, the continuously variable command parameter can be made instead to bear directly on a concomitant command produced by gesture identification. This can be achieved in different ways.

For instance:
a) by using separate muscular regions e.g. from right and left forearms using the configuration, shown in FIG. 9. As an example, the identified command gesture can be pointing a finger, recognised to command a "play" mode, while the separate gesture for the continuously variable quantity would set the volume level of the play mode, or the how far along a track the play mode should begin. In a display-based application, a similar approach can enable a pointing finger to designate the switching on of a backlight, while the gesture for the continuously controlled quantity would set the backlight intensity value. Another illustrative example is a tape fast forward or rewind command by gesture analysis and a variable speed determined by the continuously controlled quantity command gesture produce separately; and/or
b) by using substantially the same muscular regions, so that the same gesture serves to produce signals signal for both the identified gesture command and for expressing the substantially continuously variable quantity to be associated with its command. As an example, the earlier example of a finger pointing gesture can be made both to set the "play" mode and to determine the play level or the play start position, the latter being determined as a function of the intensity of the gesture (speed, vigour, tension, or amplitude), as detected directly from the sensor signals and their envelope. In this combined gesture approach, the same sensors can be used for both the command and the associated substantially variable quantity, whereupon the signals designated 14 and 14' and the envelopes designated 16 and 16' become one and the same.

The analysis of the sensor signal 14' and/or its envelope 16' to produce a continuously variable command output can simply entail deriving an intensity value, or other parameter such as one that can be used for the parameter in obtaining a signature, for all or part of the duration of the corresponding gesture.

It is clear that the present invention can be practised in many forms as regards applications, software and hardware implementations, sensor technology, sensor positioning, gesture to be analysed, commands or feedback to by produced, etc.

Moreover, the complete hardware for performing gesture identification and command execution functions (i.e. units 2 to 12) can be implemented in a wearable form (with suitable adaptation of the data transmission links as necessary). The commanded apparatus can be for instance a wearable computer, personal digital assistant, monitor, media player, medical device or the like.

In addition to the applications and implementations already described above, the invention can find use in:
consumer electronics: media players, video games, music instrument control, commanding domestic appliances (lamps, kitchen and garden equipment, sound distribution, motorised devices, etc.),
professional electronics: recording studios, stage lighting control, etc.,
art forms: controlling musical instruments, graphic animation, colour generation, DJ sound effects (scratching, mixing, fading, etc.),
institutional environments: tuition (analysing playing styles, body expression, etc.),
health and care: automatic interpretation of sign language for transcription by voice synthesis or display of symbols or typed words,
industry: control of on-line process parameters, machinery, signalling by gestures,
transport: controlling land, air or sea vehicles by gesture commands,
command, control and intelligence,
etc.

The invention claimed is:

1. Method of obtaining a signature (S) of a gesture (G) produced in free space, by deriving at least one time-evolving signal (14) representative of muscular activity involved in producing the gesture and determining at least one value of a parameter (Psfi) yielded by that signal, comprising the steps of:
time dividing the time-evolving signal (14) into sub-frames (SF1, SF2, . . . ),
for at least one sub-frame (SFi):
determining at least one said parameter value (Psfi) yielded by said time-evolving signal (14) over at least a part of that sub-frame (SFi), and
expressing said parameter value as a component of a vector (S) along a dimension thereof specifically allocated to that sub-frame (SFi),
the resultant vector forming the signature (S) of said gesture (G); and
identifying an analyzed gesture among a set of previously learnt gestures acquired in a learning mode, each learnt gesture being expressed as a signature vector, wherein a decision on the identification of a gesture under identification is produced while that gesture is still giving rise to an active time-evolving signal (14).

2. Method according to claim 1, wherein said steps of determining a said parameter value (Psfi) and expressing the latter as a component of a vector (S) are performed cyclically on the fly as said time-evolving signal (14) progresses to occupy successive sub-frames (SF1, SF2, . . . ), so that said resultant vector forming the signature (S) acquires an increasing number of dimensions during the progression of said time-evolving signal.

3. Method according to claim 1, wherein each said learnt gesture has a determined number of dimensions corresponding to a determined number of sub-frames (SF1 -SF8) over which that learnt signature was obtained, wherein said decision on an identification is produced on the basis of fewer sub-frames (SF1 -SF4) covered by the time-evolving signal (14) of the gesture under identification, relative to said determined number of sub-frames (SF1-SF8).

4. Method according to claim 1, wherein the gesture learning mode comprises, for a given class of gesture (Gk) to be learnt, the steps of:
  acquiring a set of signatures (S1-Sy) for that class of gesture by repeatedly producing that gesture and obtaining its signature,
  storing said set of signatures, and
  storing the correspondence relating said set of signatures to said learned class of gesture (Gk) and, optionally, to a command associated to said class of gesture.

5. Method according to claim 4, further comprising a gesture identification mode, in which a gesture under identification (Ge) is currently produced, comprising the steps of:
  producing on the fly at least one partial signature vector (Sc) of said gesture under identification, said partial signature vector being limited by the number parameter value(s) (Psfi) currently available, and thereby having fewer dimensions than said learnt signature vectors,
  for at least one partial signature vector produced, determining which signature among said learnt signatures best matches said partial signature vector, and
  using the result of that determining step to produce a decision on the identification of said gesture under identification.

6. Method according to claim 5, wherein said decision is produced from a number of partial signatures obtained over a period bounded by a fixed limited number of sub-frames (SF1-SF4) which is less than the total number of sub-frames (SF1-SF8) used for obtaining said learnt signatures (S1-Sy).

7. Method according to claim 5, wherein said decision is produced from a number of partial signatures obtained over a period covering a number of sub-frames which is variable as function of the result of said step of determining which signature among said learnt signatures (S1-Sy) best matches said partial signature vector.

8. Method according to claim 1, further comprising a step of deriving an envelope (16) yielded by said time-evolving signal (14), and wherein said parameter value (Psfi) is a parameter value of said envelope (16).

9. Method according to claim 8, wherein the parameter value (Psfi) is a value of at least one of:
  the signal level of the envelope,
  the power level of the envelope,
  energy level of the envelope,
  said value being preferably averaged over the duration (D) of the sub-frame (SF1, SF2, . . . ) under consideration.

10. Method according to any one of claim 1, wherein the duration (D) of each said sub-frame (SF 1, SF2, . . . ) in the gesture identification mode is made equal to the duration of its corresponding sub-frame in the learning mode.

11. Method according to claim 1, wherein said sub-frames (SF1, SF2, . . ) are substantially uniform in duration (D).

12. Method according to claim 1, further comprising a step of monitoring the onset of a gesture by detecting the crossing of a threshold (Sthresh) in the amplitude of said time-evolving signal (14), the start of the first sub-frame (SF1) being made to coincide with the time (t0) of said crossing of that threshold.

13. Method according to claim 1, wherein said time-evolving signal is an electromyographic (EMG) signal from one of a plurality of sensors (2a, 2b), each sensor output being processed as an independent channel.

14. Method according to claim 1, wherein said time-evolving signal (14) is obtained from at least one sensor (2a, 2b) positioned on a lower limb, preferably a forearm, and more preferably near the top of the forearm, to produce signals representative of a gesture involving a movement of an extremity of said limb, preferably a wrist, hand or fingers.

15. Method according to claim 14, wherein said time-evolving signal (14) is obtained from sensors (2a, 2b) at antagonistic muscle positions.

16. Method according to claim 1, applied for commanding an apparatus (12), wherein at least one said signature (Si) is made to correspond to a specific command (Ci).

17. Method according to claim 16, wherein said gesture is made to correspond to a selected trigger command (Ci) setting the apparatus (12) to enter an operating state, e.g. play, skip, pause etc.

18. Method according to claim 16, wherein said at least one signature (Si) is derived from a gesture taken from the following set of gestures:
  producing a pointing finger,
  producing an extended palm,
  rotating a wrist,
  forming a fist,
  deflecting a wrist inwards,
  deflecting a wrist outwards.

19. Method according to claim 18, used to command a media player (12) by means of at least one command gesture taken from the following set of command gestures:
  producing a pointing finger, e.g. for commanding "play",
  producing an extended palm, e.g. for commanding "stop",
  rotating a wrist, e.g. for commanding "fast forward", "rewind", or "song seek/fast play",
  forming a fist, e.g. for pause/mute,
  flexing a wrist (inward), e.g. for commanding "next track" or "step volume up";
  extending a wrist outwards, e.g. for "previous track" or "step volume down".

20. Method according to claim 1, further comprising a step of generating a substantially continuously variable command output from a signal (14', 16') representative of muscular activity involved in producing a gesture.

21. Method according to claim 20, wherein said substantially continuously variable command output is made to vary as a function of the natural oscillations of said signal (14') representative of muscular activity involved in producing a gesture, and/or as a function of an envelope (16') of that signal (14').

22. Method according to claim 20, wherein said substantially continuously variable command output is independent of a command produced by gesture identification.

23. Method according to claim 20, wherein said substantially continuously variable command parameter is made to control a quantity associated to a command produced by gesture identification.

24. Method according to claim 20, wherein the signal (14') from which said substantially continuously variable command output is extracted and the signal (14) from which said signature is obtained originate from mutually different muscular regions, e.g. from respective arms.

25. Method according to claim 20 wherein the signal (14') from which said substantially continuously variable command output is extracted and the signal (14) from which said signature is obtained originate from common muscular regions, e.g. from the same arm.

26. A memory with a computer program product (52) stored, which product comprising software code portions for performing the steps of claim 1 when executed by a computer (48).

27. Apparatus for obtaining a signature (S) of a gesture (G) produced in free space, by deriving at least one time-evolving signal (14) representative of muscular activity involved in producing the gesture and determining at least one value of a parameter (Psfi) yielded by that signal, comprising:

means (36) for time dividing the time-evolving signal (14) into sub-frames (SF 1,SF2, . . . ), means (34) for determining at least one said parameter value (Psfi) yielded by said time-evolving signal over at least a part of that sub-frame, means (42) for expressing said parameter value as a component of a vector (S) along a dimension thereof specifically allocated to that sub-frame (SFi), the resultant vector forming the signature (S) of said gesture (G), and means for identifying an analyzed gesture among a set of previously learnt gestures acquired in a learning mode, each learnt gesture being expressed as a signature vector, wherein a decision on the identification of a gesture under identification is produced while that gesture is still giving rise to an active time-evolving signal (14).

28. Apparatus according to claim 27, housed in a unit wearable by a person and further comprising means for sending extracted command inputs to a command executing apparatus (12).

29. A wearable apparatus responsive to user commands, comprising a device according to claim 27.

30. Use of the apparatus according to claim 27 for sending user command inputs to an apparatus (12).

* * * * *